(12) United States Patent
Isobe (10) Patent No.: US 9,239,483 B2
(45) Date of Patent: Jan. 19, 2016

(54) DISPLAY DEVICE COMPRISING FIRST AND SECOND CASE MEMBERS WHEREIN THE SECOND CASE MEMBER HAS A POSITION FIXING PROTRUSION

(71) Applicant: Sharp Kabushiki Kaisha, Osaka (JP)

(72) Inventor: Hiroaki Isobe, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/401,280

(22) PCT Filed: Apr. 26, 2013

(86) PCT No.: PCT/JP2013/002834
§ 371 (c)(1),
(2) Date: Nov. 14, 2014

(87) PCT Pub. No.: WO2013/171987
PCT Pub. Date: Nov. 21, 2013

(65) Prior Publication Data
US 2015/0116630 A1    Apr. 30, 2015

(30) Foreign Application Priority Data

May 17, 2012  (JP) ................. 2012-113062

(51) Int. Cl.
*G02F 1/1333* (2006.01)
*F21V 7/04* (2006.01)
*F21V 8/00* (2006.01)

(52) U.S. Cl.
CPC ........ *G02F 1/133308* (2013.01); *G02B 6/0088* (2013.01); *G02F 2001/13332* (2013.01); *G02F 2001/133314* (2013.01); *G02F 2001/133322* (2013.01); *G02F 2001/133325* (2013.01); *G02F 2001/133354* (2013.01)

(58) Field of Classification Search
CPC .............. G02F 1/133308; G02F 2001/133325; G02F 2001/133354; G02F 2001/133314; G02F 2001/13332; G02B 6/0088
USPC ................................................... 362/632–633
See application file for complete search history.

(56) References Cited

U.S. PATENT DOCUMENTS

| | | | |
|---|---|---|---|
| 2009/0004408 A1 | 1/2009 | Nakanishi et al. | |
| 2009/0256988 A1* | 10/2009 | Kim .................. | G02F 1/133604 349/58 |
| 2009/0316063 A1 | 12/2009 | Watanabe | |
| 2010/0165244 A1* | 7/2010 | Shin .................. | G02F 1/133308 349/62 |
| 2012/0127391 A1* | 5/2012 | Ahn .................. | G02F 1/133308 349/58 |
| 2012/0257136 A1* | 10/2012 | Horiuchi .............. | G02B 6/0085 349/58 |

FOREIGN PATENT DOCUMENTS

| JP | 2009-031756 A | 2/2009 |
|---|---|---|
| JP | 2010-2745 A | 1/2010 |
| JP | 2010-134139 A | 6/2010 |
| JP | 2011-034052 A | 2/2011 |
| JP | 2011-198769 A | 10/2011 |

* cited by examiner

*Primary Examiner* — Paul Lee
(74) *Attorney, Agent, or Firm* — Chen Yoshimura LLP (57) ABSTRACT

A display device is provided with: a display panel; a housing which has a first case member that is provided with a supporting portion for supporting the display panel and is formed of a metal material and a second case member that is provided with a facing part facing the supporting portion and is formed of a metal material; a position fixing protrusion that is formed on the facing part so as to protrude toward the supporting part and so as to position the display panel with respect to the case; and an opening which is formed in the supporting portion and through which the position fixing protrusion is inserted.

6 Claims, 7 Drawing Sheets

DISPLAY DEVICE COMPRISING FIRST AND SECOND CASE MEMBERS WHEREIN THE SECOND CASE MEMBER HAS A POSITION FIXING PROTRUSION

TECHNICAL FIELD

The present invention is related to a display device provided with a housing that supports the display panel.

BACKGROUND ART

Thin display devices (flat panel displays) such as liquid crystal display devices and organic EL display devices are suitable for display devices of electronic devices such as smartphones and tablet PCs, for example. Among such display devices, those that have a display panel and a housing that support the display panel are known.

A liquid crystal display device disclosed in Patent Document 1 is provided with a liquid crystal display panel and a backlight unit having a housing supporting the liquid crystal display panel. The backlight unit includes a circuit substrate having a plurality of light emitting elements, a light guide plate, a resin mold that houses a light guide plate, a metal case that houses the resin mold, and a metal frame that is engaged with the exterior of the metal case. The housing is formed of the metal frame and the metal case.

The light guide plate in Patent Document 1 has a recessed fixture that engages a projection formed on the resin mold. Furthermore, the metal case has an opening that engages with the protrusion formed on the resin mold. As a result, the light guide plate is fixed to a metal case through a resin mold. Meanwhile, in the metal case, the circuit substrate is bonded to a side face of the light guide plate opposite to the light receiving face thereof.

In this manner, according to the display device in Patent Document 1, because the circuit substrate and the light guide plate are fixed to the metal case, the positioning of the light emitting element of the circuit substrate to the light guide plate is facilitated, and the heat from the light emitting element can be released efficiently.

RELATED ART DOCUMENTS

Patent Documents

Patent Document 1: Japanese Patent Application Laid-Open Publication No. 2010-2745

SUMMARY OF THE INVENTION

Problems to be Solved by the Invention

However, the display device in Patent Document 1 does not have a structure that fixes the position of the display panel on the housing. Therefore, it is difficult to improve the assembling accuracy.

To deal with this issue, a position fixing part can be formed by cutting and raising a portion of the upper surface of the metal frame. However, in this case, a large opening will be formed on the upper surface of the metal frame where cutting and raising occurs, which causes a problem that foreign matter can easily enter the housing. Furthermore, because an unnecessary opening is formed in the metal frame, a problem that arises is that the mechanical strength of the metal frame decreases. This problem of frame strength is a highly important one as display devices are being made increasingly thinner and smaller.

The present invention was made in view of these points, and aims at improving the assembly accuracy of the display panel to the housing and suppressing foreign matter from entering the housing for a display device having a housing that supports the display panel.

Means for Solving the Problems

To achieve the above-mentioned goals, the display device according to the first invention includes: a display panel; and a housing including a first case member and a second case member, the first case member having a supporting portion that supports the display panel and being formed of a metallic material, the supporting portion having a peripheral area that is outside of an area where the supporting portion is physically in contact with the display panel, the second case member having a facing part that faces a rear side of the supporting portion and being formed of a metallic material, wherein the facing part of the second case member has a position fixing protrusion for defining a position of the display panel relative to the housing, the position fixing protrusion protruding towards the peripheral area of the supporting portion of the first case member, and wherein the peripheral area of the supporting portion has an opening therein to allow the position fixing protrusion to penetrate therethrough.

According to this invention, the position fixing protrusion formed on the facing part of the second case member has a tip portion that protrudes farther in the direction of the display panel than the supporting portion by being inserted into the opening formed in the supporting portion of the first case member. Therefore, the assembling accuracy of the display panel can be improved as the display panel is supported by the supporting portion of the housing while being fixed by the position fixing protrusion.

Moreover, because the position fixing protrusion formed in the second case member is configured to be inserted into the opening of the first case member, compared to a housing in which the member for fixing the position of the display panel is cut and raised from the first case member itself, the entry of foreign matter into the case of this configuration can be suppressed greatly by decreasing the opening area formed in the first case member. Furthermore, because the opening area of the first case member becomes smaller, the decrease in the mechanical strength of the housing can be suppressed.

The second invention is the first invention, wherein the second case member has a side wall extending from an outer edge of the facing part towards the peripheral area of the supporting portion, and wherein the position fixing protrusion is formed as an extension of the side wall.

According to this invention, because the position fixing member for the display panel does not need to be provided separately from the side wall, the housing can be made smaller even while having a position fixing protrusion.

The third invention is the second invention, wherein the side wall of the second case member is formed by performing hemming bending on a metal plate that is integrated with the facing part such that an entirety of the side wall is made of a folded over metal plate, thereby the side wall being greater in thickness than the facing part.

According to this invention, because the side wall is formed by hemming the metal plate, the position fixing protrusion that is a portion of the side wall is also hemmed and has a thickness greater than the thickness of the facing part. Thus, the mechanical strength of the side wall and the position fixing protrusion can be improved while making the entire housing thin by making the facing part thin.

The fourth invention is the second invention, wherein the side wall of the second case member has the same thickness as the facing part thereof, and wherein the respective thicknesses of the side wall and the facing part are greater than a thickness of the supporting portion of the first case member.

According to this invention, both the mechanical strength of the entire housing and the position fixing protrusion can be improved by making the thickness of the side wall and the facing part greater than the supporting portion.

The fifth invention is any one of the first to fourth inventions, wherein the position fixing protrusion is provided in a vicinity of a corner of the display panel having a rectangular shape.

According to this invention, when assembling the display device, a corner portion of the display panel can be easily fixed to a prescribed location of the housing.

The sixth invention is any one of the first to fifth inventions, wherein the display panel is a liquid crystal display panel, and wherein a light guide plate of a backlight unit that is an illumination device is housed inside the housing.

According to this invention, display anomalies due to the entry of foreign matter can be suppressed, because the assembling accuracy of the liquid crystal display panel to the housing is improved and foreign matter is prevented from entering the housing where the light guide plate is housed.

Effects of the Invention

According to the present invention, the assembling accuracy of the display device can be improved because a supporting portion of a housing can support the display panel while the display panel is fixed by the position fixing protrusion. Moreover, because the position fixing protrusion formed in the second case member is configured to be inserted into an opening of the first case member, the entry of foreign matter into the housing of this configuration can be suppressed greatly by decreasing the opening area formed in the first case member compared to a housing in which the member for fixing the position of the display panel is cut and raised from the first case member itself.

DETAILED DESCRIPTION OF EMBODIMENTS

Embodiments of the present invention will be described in detail below with reference to drawings. The present invention is not limited to the embodiments below.

Embodiment 1

FIGS. 1 to 8 show Embodiment 1 of the present invention.

Figure 1:
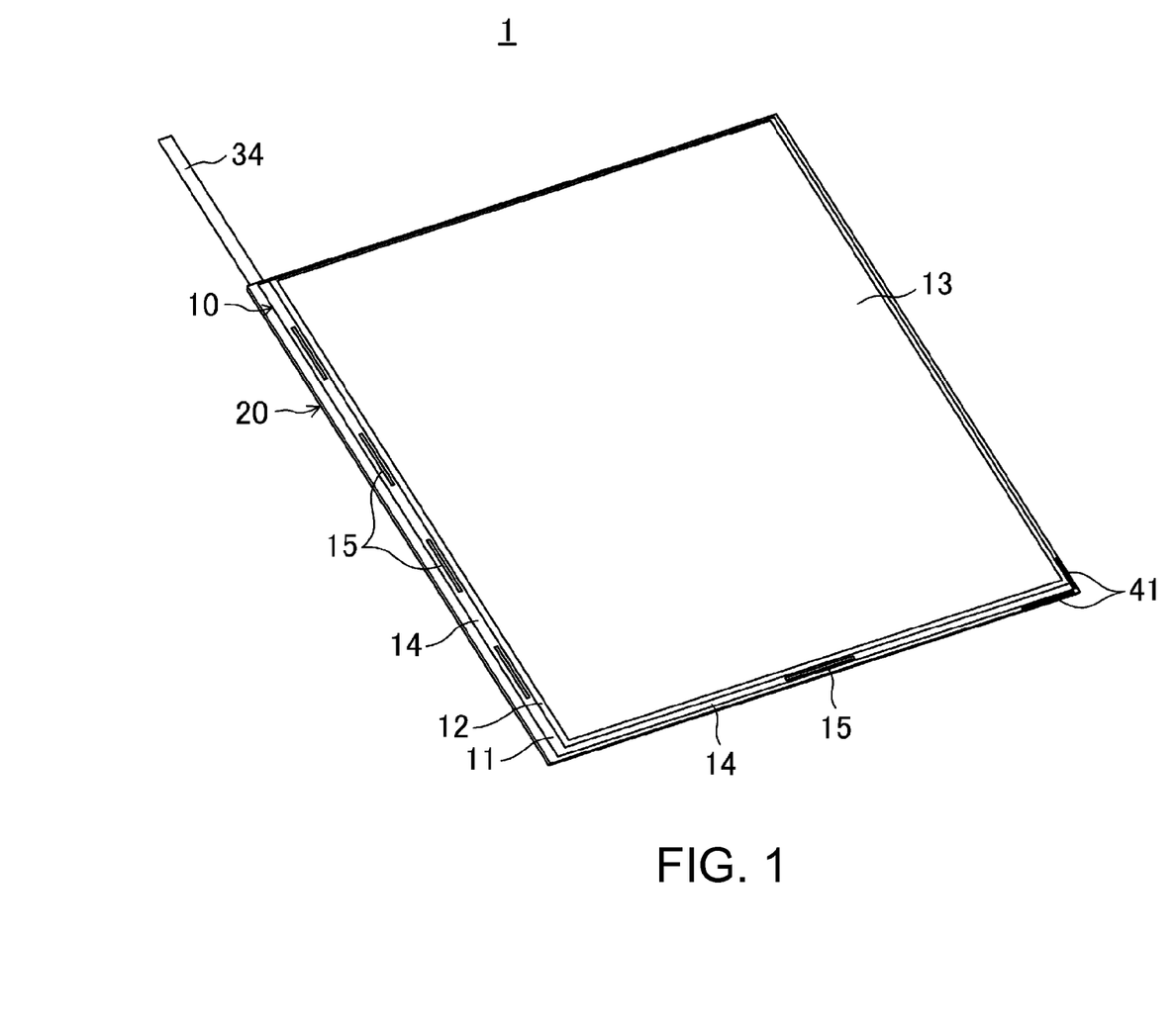
FIG. 1 is a perspective view that shows main components of a liquid crystal display device of Embodiment 1.
Figure 2:
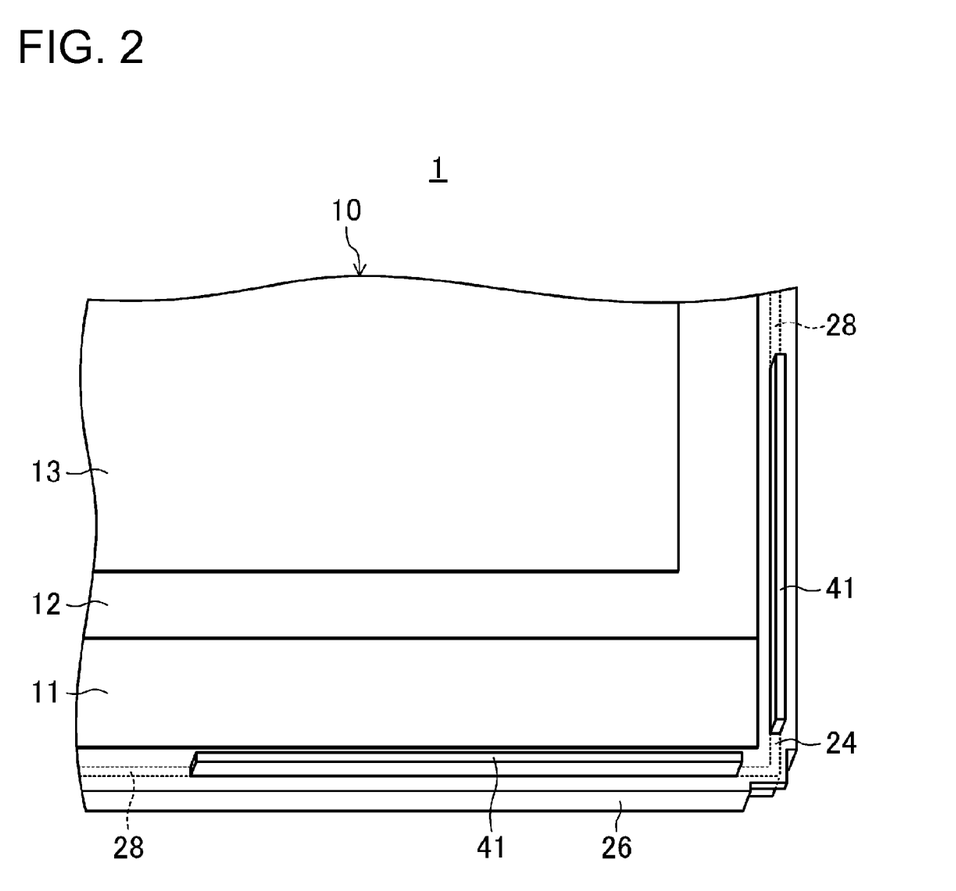
FIG. 2 is a perspective view that shows a corner portion of the liquid crystal display device of Embodiment 1.
Figure 3:
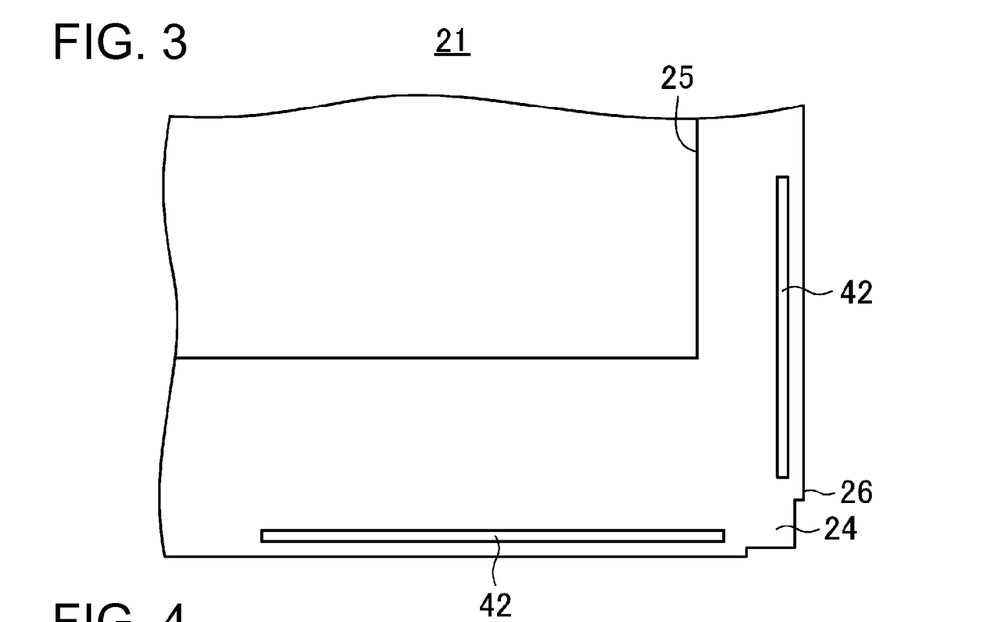
FIG. 3 is a front view of a corner portion of a first case member in Embodiment 1.
Figure 4:
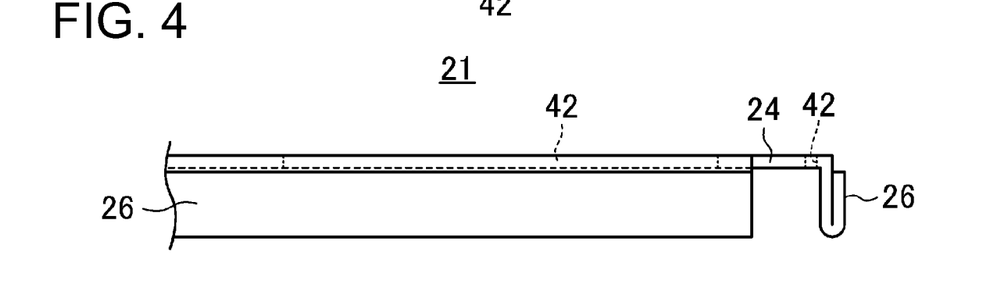
FIG. 4 is a side view of a corner portion of a first case member in Embodiment 1.

FIG. 1 is a perspective view of main components of a liquid crystal display device 1. FIG. 2 is a perspective view of a corner portion of a liquid crystal display device 1. FIG. 3 is a front view showing a corner portion of the first case member 21. FIG. 4 is a side view showing a portion of the first case member 21.

Figure 5:
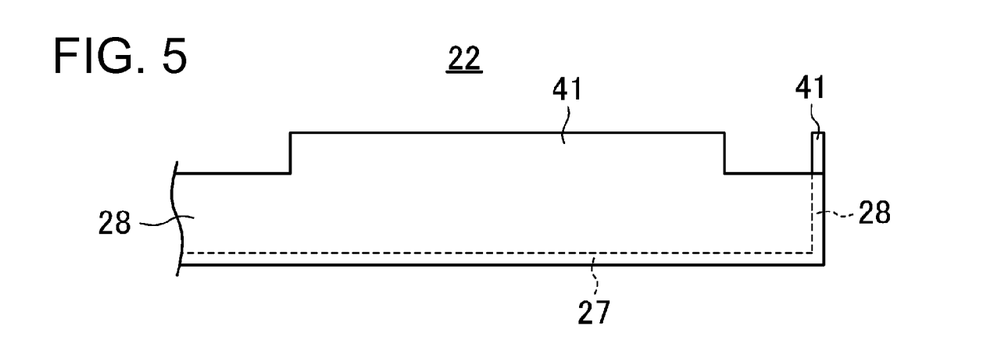
FIG. 5 is a side view of a portion of a second case member in Embodiment 1.
Figure 6:
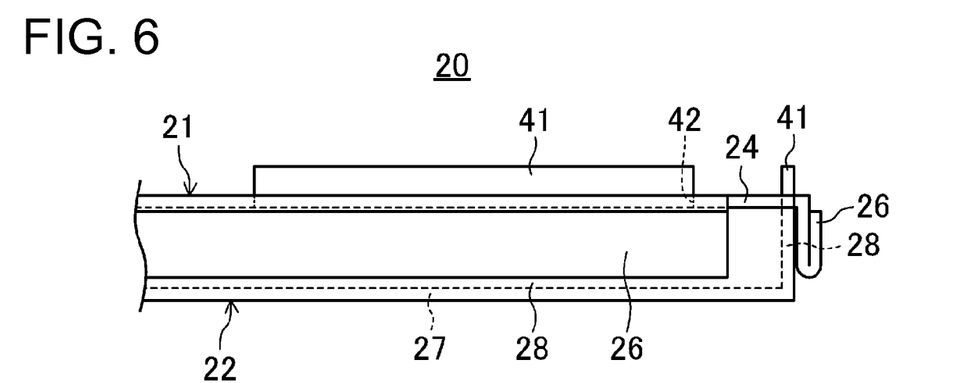
FIG. 6 is a side view of a portion of a housing in Embodiment 1.
Figure 7:
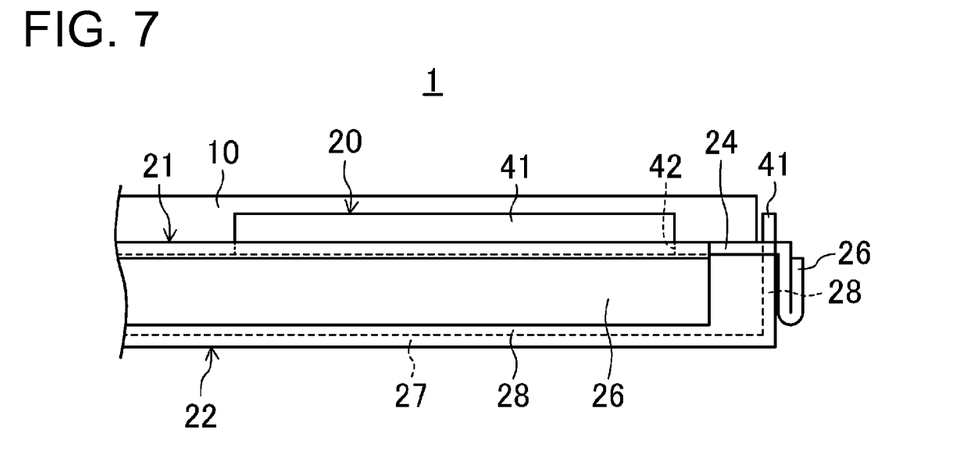
FIG. 7 is a side view that shows a portion of a liquid crystal display device of Embodiment 1.
Figure 8:
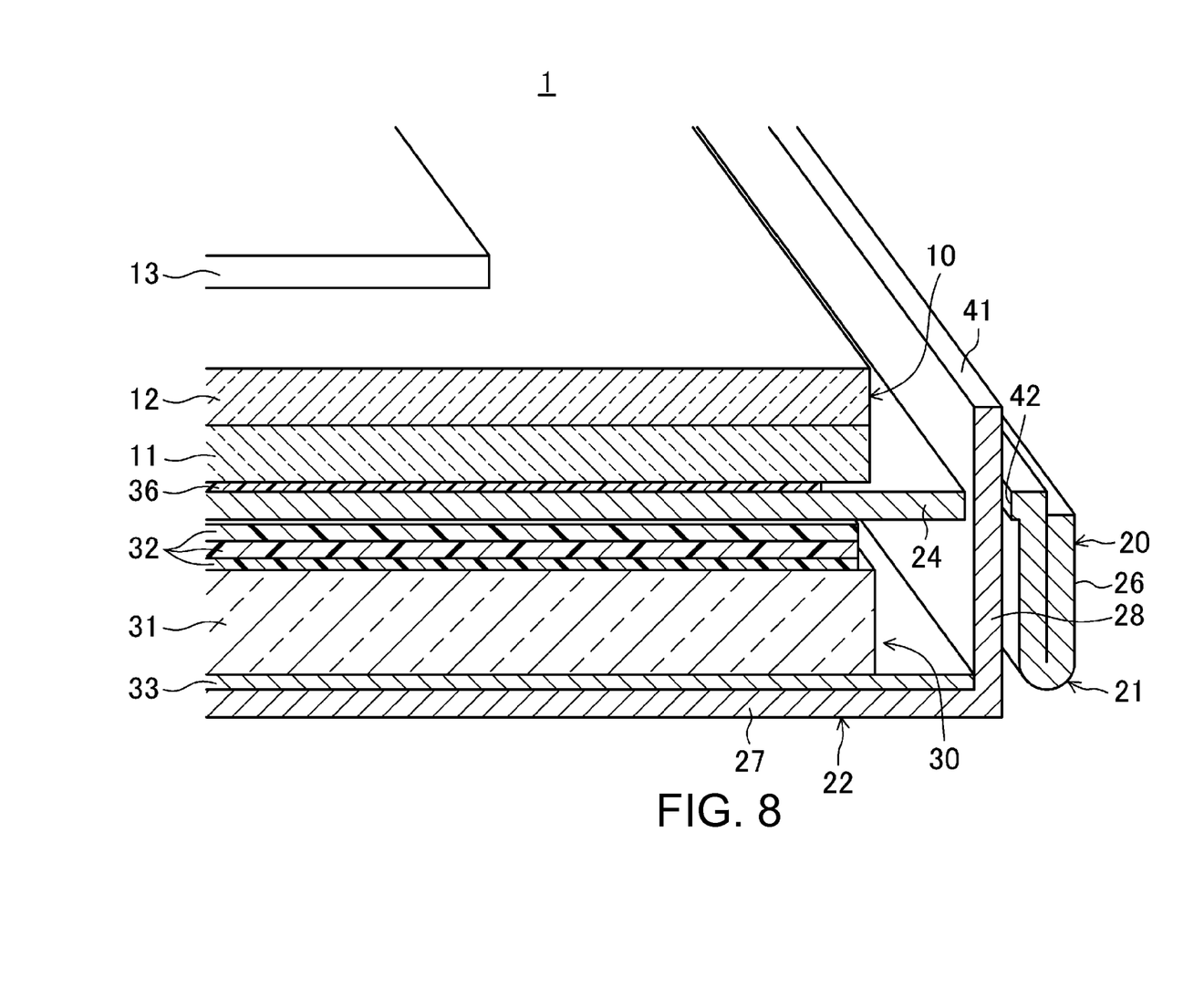
FIG. 8 is a perspective view that shows a cross-section of the configuration of a liquid crystal display device of Embodiment 1.

FIG. 5 is a side view showing a portion of the second case member 22. FIG. 6 is a side view showing a portion of a housing 20. FIG. 7 is a side view of a portion of the liquid crystal display device 1. FIG. 8 is a perspective view of a cross-section of a configuration of a liquid crystal display device 1.

In the present embodiment, the liquid crystal display device 1 will be described as an example of the display device of the present invention. As shown in FIGS. 7 and 8, the liquid crystal display device 1 has a liquid crystal display panel 10 and a housing 20 that supports the liquid crystal display panel 10.

(Configuration of Liquid Crystal Display Panel)

As shown in FIGS. 1 and 8, the liquid crystal display panel 10 includes a TFT substrate 11 as an active matrix substrate, an opposite substrate 12 disposed so as to face the TFT substrate 11, and a liquid crystal layer (not shown) provided between the TFT substrate 11 and the opposite substrate 12.

A plurality of pixels (not shown) are formed on the liquid crystal display panel 10. On the TFT substrate 11, a TFT (thin film transistor that is not shown) is formed for each pixel. A polarizing plate 13 is attached to a side of the opposite substrate 12 opposite to the TFT substrate 11.

Furthermore, as shown in FIG. 1, the TFT substrate 11 has an end region 14. On the end region 14, a plurality of IC drivers 15 for motor drive control of the liquid crystal display panel 10 are mounted.

(Backlight Unit Configuration)

The housing 20 houses a light guide plate 31 formed in a rectangular plate shape, a plurality of optical sheets 32, LEDs (light emitting diodes) that are not shown, and a reflecting sheet 33, which constitute a backlight unit 30 that is an illumination device.

The backlight unit 30 is an edge-lit backlight unit. The plurality of optical sheets 32 are layered on a surface of the light guide plate 31 facing the liquid crystal display panel 10. The optical sheets 32 are sheets for adjusting characteristics of the light emitted from the light guide plate 31, and are constituted of a diffusion sheet, a prism sheet, and the like.

A reflective sheet 33 is provided on a side of the optical sheet 32 opposite to the light guide plate 31. Although not shown in the drawings, a plurality of LEDs are arranged along a side face of the light guide plate 31 at a prescribed gap therebetween. The plurality of LEDs are connected to an FPC 34 for drive control of the LEDs shown in FIG. 1. The FPC 34 is drawn out from inside the housing 20.

(Configuration of Housing)

As shown in FIGS. 3 to 8, the housing 20 has a first case member 21, and a second case member 22 that engages the first case member 21. The first case member 21 and the second case member 22 are respectively formed of a metal.

The first case member 21 has a supporting portion 24 that supports the liquid crystal display panel 10. As shown in FIG. 3, the supporting portion 24 is formed in a rectangular plate shape, and an opening 25 is formed in a rectangular shape in the center of the supporting portion 24. The opening 25 is for allowing the illuminating light from the backlight unit 30 to travel towards the liquid crystal display panel 10, which is outside the housing 20. The liquid crystal display panel 10 is bonded to the supporting portion 24 through a double-sided adhesive tape 36 that has a rectangular frame shape.

Also, the first case member 21 has a first side wall 26 that extends from the edge of the supporting portion 24 towards a direction opposite to the liquid crystal display panel 10. The first side wall 26 is formed of a metal plate that is integrally formed with the supporting portion 24, and as shown in FIG. 8, the thickness thereof is greater than the thickness of the supporting portion 24 because the metal plate is hemmed.

In the second case member 22, a facing part 27 that faces the supporting portion 24 of the first case member 21 is formed. The facing part 27 is formed in a rectangular plate shape, and the reflective sheet 33 is provided on the surface of the facing part 27 facing the supporting portion 24. Also, the second case member 22 has a second side wall 28 that extends towards the supporting portion 24 from an edge of the facing part 27. The second side wall 28 is formed of a metal plate integrally formed with the facing part 27. The second side wall 28 is provided along the inner surface side (namely, the side facing the light guide plate 31) of the first side wall 26. Furthermore, in the present embodiment, the thickness of the facing part 27 and the second side wall 28 is the same as the thickness of the supporting portion 24.

The liquid crystal display device 1 is provided with a position fixing protrusion 41 and an opening 42 formed in the supporting portion 24. The position fixing protrusion 41 is formed on the facing part 27 so as to protrude in the direction towards the supporting portion 24, the position fixing protrusion 41 defining the position of the liquid crystal display panel 10 with respect to the housing 20. The position fixing protrusion 41 is inserted through the opening 42.

As shown in FIG. 5, the position fixing protrusion 41 is formed such that a portion thereof is a part of the second side wall 28 that extends in the direction towards the liquid crystal display panel 10. The thickness of the position fixing protrusion 41 is the same as the thickness of the second side wall 28. It is preferable that the length of the position fixing protrusion 41 be approximately 5 to 20 mm if the display region of the liquid crystal display panel 10 is 10 inches.

As shown in FIGS. 1 and 2, the position fixing protrusion 41 is disposed in the vicinity of a corner of the liquid crystal display panel 10 formed in a rectangular shape. Furthermore, the respective position fixing protrusions 41 extend along sides of the liquid crystal display panel 10. Meanwhile, as shown in FIG. 3, the openings 42 respectively have a slit shape extending along a side of the liquid crystal display panel 10 in a manner similar to the respective position fixing protrusions 41.

In order to house the light guide plate 31, the optical sheet 32, and the like, the position fixing protrusion 41 of the second case member 22 is inserted into the opening 42 of the first case member 21 while the first case member 21 and the second case member 22 are engaged and attached, the tip portion of the position fixing protrusion 41 protruding farther towards the liquid crystal display panel 10 than the supporting portion 24.

Also, it is preferable that the housing 20 be configured such that the outer surface of the position fixing protrusion 41 is in contact with the inner surface of the opening 42. In this manner, entry of foreign matter into the housing 20 can be reliably prevented, and the mechanical strength of the housing 20 can be further increased.

In the liquid crystal display device 1, the light emitted from a plurality of LEDs is guided inside the light guide plate 31. The light emitted from the light guide plate 31 towards the reflective sheet 33 is reflected by the reflective sheet 33 and is again received by the light guide plate 31. In this manner, the characteristics of the light emitted from the light guide plate 31 to the optical sheet 32 are adjusted by the optical sheets 32 and supplied to the liquid crystal display panel 10 through the opening 25 of the first case member 21. The liquid crystal display panel 10 performs a desired display by selectively allowing light from the backlight unit 30 to pass therethrough.

(Manufacturing Method)

As shown in FIGS. 4 to 6, if the liquid crystal display device 1 is being manufactured, first the housing 20, which houses the backlight unit 30, is assembled. In other words, the first case member 21 and the second case member 22 are engaged so as to house the reflective sheet 33, the light guide plate 31, the optical sheets 32, the LEDs, and the like. At this time, the position fixing protrusion 41 of the second case member 22 is inserted into the opening 42 of the first case member 21.

Next, as shown in FIGS. 7 and 8, the liquid crystal display panel 10 is bonded onto the supporting portion 24 of the housing 20 by the double-sided adhesive tape 36, which is in a frame shape. At this time, the prescribed position where the liquid crystal display panel 10 is bonded to the housing 20 is easily defined by the position fixing protrusion 41. There is an approximately 0.1 to 2 mm gap between the liquid crystal display panel 10 and the position fixing protrusion 41, but the liquid crystal display panel 10 and the position fixing protrusion 41 may be in contact with each other. The liquid crystal display device 1 is manufactured in this manner.

Effects of Embodiment 1

By inserting the position fixing protrusion 41 formed on the facing part 27 of the second case member 22 into the opening 42 formed in the supporting portion 24 of the first case member 21, the tip portion of the position fixing protrusion 41 protrudes farther towards the liquid crystal display panel 10 than the supporting portion 24. Therefore, the supporting portion 24 of the housing 20 can support the liquid crystal display panel 10 while the position fixing protrusion 41 fixes the liquid crystal panel 10, and thus, the assembling accuracy of the liquid crystal display device 1 can be greatly increased.

Furthermore, because the position fixing protrusion 41 formed in the second case member 22 is inserted into the opening 42 of the first case member 21 in the configuration, the area of the opening formed in the first case member 21 can be reduced compared to if the member for fixing the position of the liquid crystal display panel 10 is cut and raised from the first case member 21 itself. As a result of the area of the opening in the first case member 21 is reduced, entry of foreign matter into the housing can be greatly suppressed, and a decrease in mechanical strength in the housing 20 can be suppressed.

Furthermore, because the position fixing protrusion 41 is formed of a portion extending from a section of the second side wall 28, the member that fixes in place the liquid crystal display panel 10 does not need to be provided separate from the second side wall 28. Thus, the housing 20 can be made smaller even with the position fixing protrusion 41 being provided.

Furthermore, because the position fixing protrusion 41 is disposed in the vicinity of a corner of the liquid crystal display panel 10 when the liquid crystal display device 1 is being assembled, the liquid crystal display panel 10 can be easily fixed in a prescribed location of the housing 20 at the corner of the liquid crystal display panel 10.

In addition, the assembling accuracy of the liquid crystal display panel 10 to the housing 20 increases and the entry of foreign matter into the housing 20 that houses the light guide plate 31 is suppressed. Thus, display anomalies caused by contamination can be suppressed.

Embodiment 2

Figure 9:
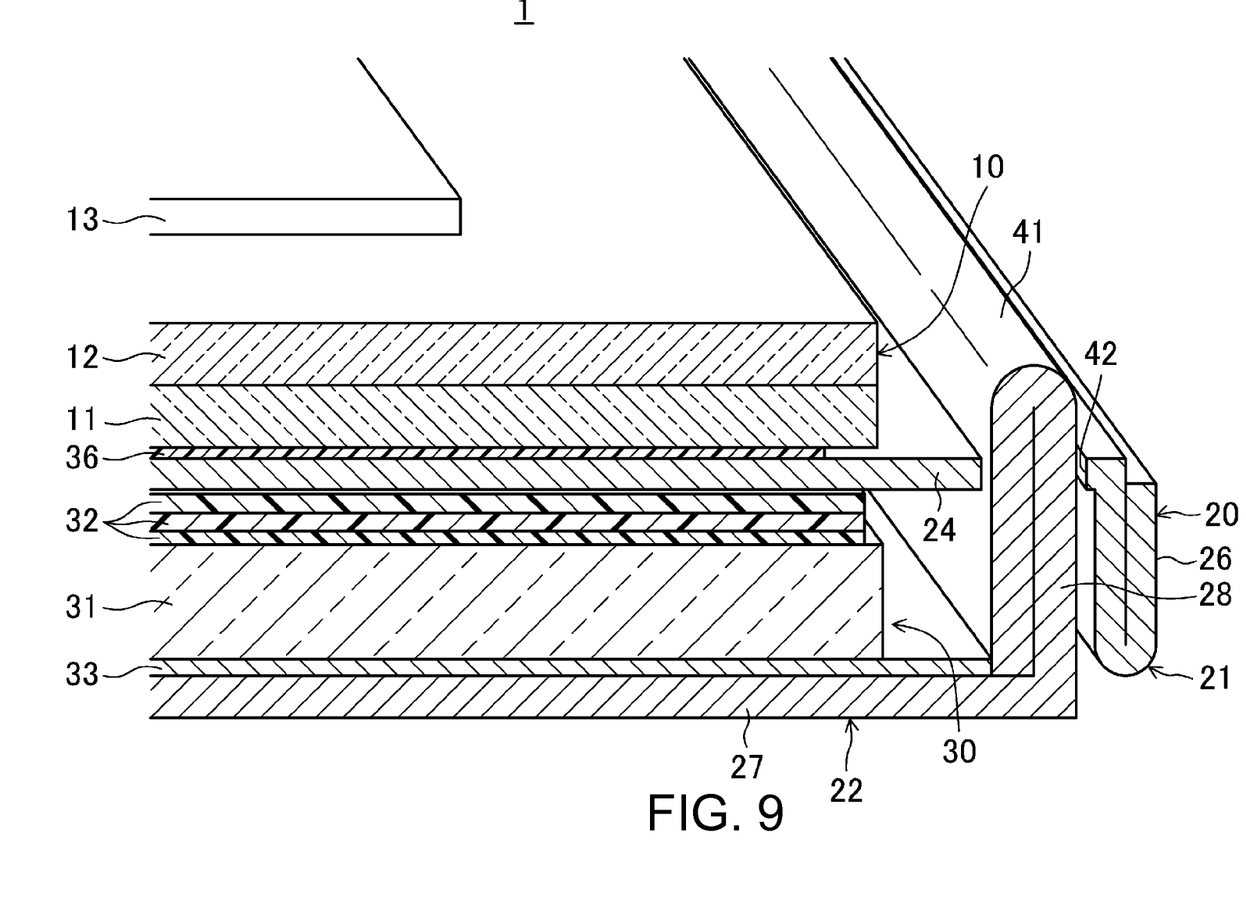
FIG. 9 is a perspective view that shows a cross-section of the configuration of a liquid crystal display device of Embodiment 2.

FIG. 9 shows Embodiment 2 of the present invention.

FIG. 9 is a perspective view that shows a cross-section of a liquid crystal display device 1 of Embodiment 2. In each embodiment below, parts that are the same as FIGS. 1 to 8 are assigned the same reference characters and detailed descriptions thereof will be omitted.

In Embodiment 1, the second side wall 28 of the second case member 22 was formed such that the thickness thereof was the same as the thickness of the facing part 27. By contrast, as shown in FIG. 9, the second side wall 28 of the present embodiment is thicker than the facing part 27.

In other words, the second side wall 28 is formed by hemming a metal plate that is integrally formed with the facing part 27. As a result, the second side wall 28 is thicker than the facing part 27.

The first side wall 26 of the first case member 21 is hemmed such that the tip of the metal plate is folded towards the outer side. On the other hand, the second side wall 28 of the second case member 22 is hemmed such that the tip side of the metal plate is folded towards the inner side. In other words, the direction that the second side wall 28 is hemmed is opposite to the direction that the first side wall 26 is hemmed. However, the folding directions of the first side wall 26 and the second side wall 28 are not limited to the directions mentioned above.

Thus, according to the present embodiment, in a similar manner to Embodiment 1, as the position fixing protrusion 41 formed in the second case member 22 is configured to be inserted into the opening 42 of the first case member 21, the assembling accuracy of the liquid crystal display panel 10 to the housing 20 is increased and the entry of foreign matter into the housing 20 of this configuration can also be suppressed.

Moreover, as the second side wall 28 is formed by hemming a metal plate, the position fixing protrusion 41 that is a part of the second side wall 28 can be made thicker than the facing part 27 through hemming. Thus, the thickness of the entire housing 20 can be decreased by making the facing part 27 thinner, while increasing the mechanical strength of the second side wall 28 and the position fixing protrusion 41.

Embodiment 3

Figure 10:
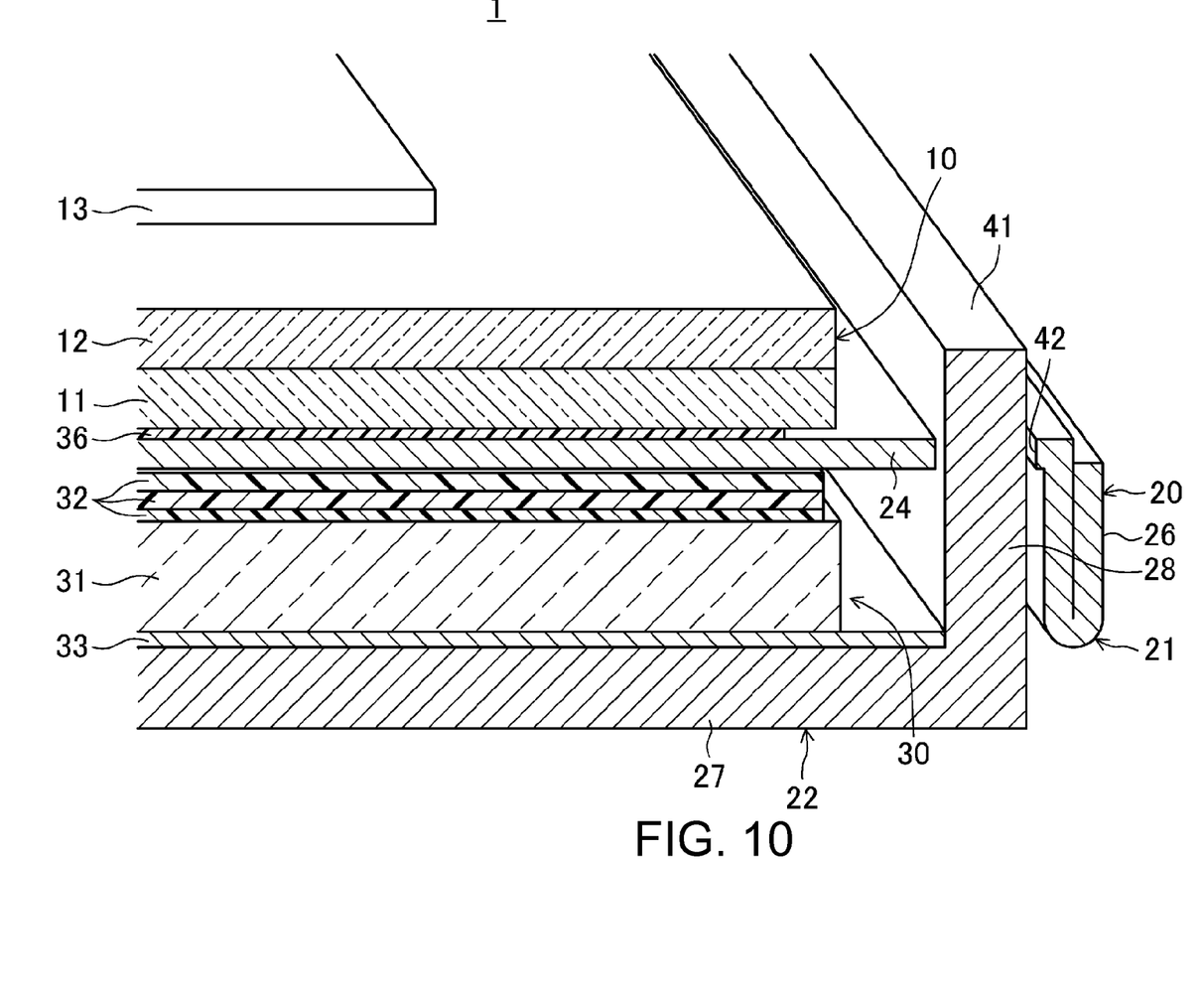
FIG. 10 is a perspective view that shows a cross-section of a structure of a liquid crystal display device according to Embodiment 3.

FIG. 10 shows Embodiment 3 of the present invention.

FIG. 10 is a perspective view that shows a cross-section of a liquid crystal display device 1 of Embodiment 3.

In Embodiment 1, the facing part 27 of the second case portion and the second side wall 28 were formed such that the thickness of both is the same as the thickness of the supporting portion 24 of the first case member 21. By contrast, the second case member 22 of the present embodiment is thicker than the first case member 21.

In other words, the thickness of the second side wall 28 of the second case member 22 and the thickness of the facing part 27 are the same, and the thickness of both the second side wall 28 and the facing part 27 is greater than the thickness of the supporting portion 24.

Thus, according to the present embodiment, in a similar manner to Embodiment 1, because the position fixing protrusion 41 formed in the second case member 22 is configured to be inserted into the opening 42 of the first case member 21, the assembling accuracy of the liquid crystal display panel 10 to the housing 20 is increased and the entry of foreign matter into the housing 20 can also be suppressed.

In addition, because the thickness of the second side wall 28 and the facing part 27 is greater than the thickness of the supporting portion 24, the mechanical strength of both the entire housing 20 and the position fixing protrusion 41 can be easily increased.

Other Embodiments

In Embodiments 1 to 3, a liquid crystal display device having a display panel that is a liquid crystal display panel is provided as an example, but the present invention is not limited to a liquid crystal display device. The present invention can be suitably used in other display devices such as an organic EL display device having a display panel such as an organic EL display panel.

In the case of an organic EL display device, the reference character 10 in FIG. 7 may be assigned an organic EL display panel with the housing 20 supporting the organic EL display panel 10, for example. Also, a configuration may be adopted in which a touch panel is layered onto the liquid crystal display panel 10 or the organic EL display panel 10.

In Embodiments 1 to 3, a case in which the position fixing protrusion 41 is formed as a portion of the second side wall 28 of the second case member 22 was described, but the present invention is not limited to this, and the position fixing protrusion 41 formed separately from the second side wall 28 may be formed on the second case member 22. However, if the position fixing protrusion 41 is formed as a portion of the second side wall 28 as in the respective embodiments, then the structure of the second case member 22 becomes simple and the size of the entire housing 20 can be reduced, which is preferable.

The present invention is not limited to Embodiments 1 to 3 described above, and any appropriate combination of these Embodiments 1 to 3 are also included in the present invention.

INDUSTRIAL APPLICABILITY

As described above, the present invention is useful for a display device having a housing that supports the display panel.

DESCRIPTION OF REFERENCE CHARACTERS

1 liquid crystal display device
10 liquid crystal display panel
20 housing
21 first case member
22 second case member 24 supporting portion
27 facing part
28 second side wall
30 backlight unit
31 light guide plate
41 position fixing protrusion
42 opening

What is claimed is:

1. A display device, comprising:
a display panel; and
a housing including a first case member and a second case member, the first case member having a supporting portion that supports the display panel and being formed of a metallic material, the supporting portion having a peripheral area that is outside of an area where the supporting portion is physically in contact with the display panel, the second case member having a facing part that faces a rear side of the supporting portion and being formed of a metallic material,
wherein the facing part of the second case member has a position fixing protrusion for defining a position of the display panel relative to the housing, the position fixing protrusion protruding towards said peripheral area of the supporting portion of the first case member, and
wherein said peripheral area of the supporting portion has an opening therein to allow the position fixing protrusion to penetrate therethrough.

2. The display device according to claim 1,
wherein the second case member has a side wall extending from an outer edge of the facing part towards said peripheral area of the supporting portion, and
wherein the position fixing protrusion is formed as an extension of a portion of the side wall.

3. The display device according to claim 2, wherein the side wall of the second case member is formed by performing hemming bending on a metal plate that is integrally formed with said facing part such that an entirety of the side wall is made of a folded over metal plate, the side wall thereby being greater in thickness than said facing part.

4. The display device according to claim 2,
wherein the side wall of the second case member has the same thickness as the facing part thereof, and
wherein the respective thicknesses of the side wall and the facing part are greater than a thickness of the supporting portion of the first case member.

5. The display device according to claim 1, wherein the position fixing protrusion is provided in a vicinity of a corner of the display panel having a rectangular shape.

6. The display device according to claim 1,
wherein the display panel is a liquid crystal display panel, and
wherein a light guide plate of a backlight unit that is an illumination device is housed inside the case.

* * * * *